US010749196B2

United States Patent
Raaheim et al.

(10) Patent No.: US 10,749,196 B2
(45) Date of Patent: Aug. 18, 2020

(54) METHOD AND DEVICE FOR SIMULTANEOUS PRODUCTION OF ENERGY IN THE FORMS ELECTRICITY, HEAT AND HYDROGEN GAS

(75) Inventors: Arne Raaheim, Nannestad (NO); Arild Vik, Blomsterdalen (NO)

(73) Assignee: ZEG Power AS, Bergen (NO)

( * ) Notice: Subject to any disclaimer, the term of this patent is extended or adjusted under 35 U.S.C. 154(b) by 835 days.

(21) Appl. No.: 13/518,486

(22) PCT Filed: Nov. 3, 2010

(86) PCT No.: PCT/NO2010/000400
§ 371 (c)(1),
(2), (4) Date: Jun. 28, 2012

(87) PCT Pub. No.: WO2011/078681
PCT Pub. Date: Jun. 30, 2011

(65) Prior Publication Data
US 2012/0270119 A1    Oct. 25, 2012

(30) Foreign Application Priority Data
Dec. 22, 2009    (NO) .................................. 20093575

(51) Int. Cl.
*H01M 8/06*    (2016.01)
*H01M 8/0668*    (2016.01)
(Continued)

(52) U.S. Cl.
CPC ............. *H01M 8/0668* (2013.01); *C01B 3/34* (2013.01); *C01B 3/56* (2013.01); *C10J 3/00* (2013.01); *H01M 8/04007* (2013.01); *H01M 8/0612* (2013.01); *H01M 8/0662* (2013.01); *H01M 16/003* (2013.01); *B01D 53/62* (2013.01); *C01B 2203/0216* (2013.01); *C01B 2203/0233* (2013.01); *C01B 2203/0283* (2013.01);
(Continued)

(58) Field of Classification Search
CPC . H01M 8/0668; H01M 16/003; H01M 8/0612
USPC ........................................................ 429/412
See application file for complete search history.

(56) References Cited

U.S. PATENT DOCUMENTS 6,821,501 B2    11/2004 Matzakos et al.
8,349,504 B1 *    1/2013 Radovich ...................... 429/426
(Continued)

*Primary Examiner* — Miriam Stagg
*Assistant Examiner* — Brent C Thomas
(74) *Attorney, Agent, or Firm* — Alix, Yale & Ristas, LLP

(57) ABSTRACT

A method and device for sustainable, simultaneous production of energy in the forms electricity, hydrogen gas and heat from a carbonaceous gas, the method having the following steps: 1. continuously dividing a feed charge of carbonaceous gas into a first feed gas flow and a second feed gas flow, 2. charging the first feed gas flow to a primary SOFC to produce electricity and heat and $CO_2$, 3. charging the other feed gas flow, to a hydrogen gas forming reactor system to produce hydrogen and $CO_2$, 4. heating the hydrogen gas forming system at least partially by heat developed in at least one SOFC, 5. optionally capturing the $CO_2$ formed in the primary SOFC by burning the "afterburner" gases in pure oxygen and drying the exhaust gas, 6. capturing the $CO_2$ formed in the hydrogen gas forming reactor system by use of an absorbent.

10 Claims, 11 Drawing Sheets

Figure 1A:
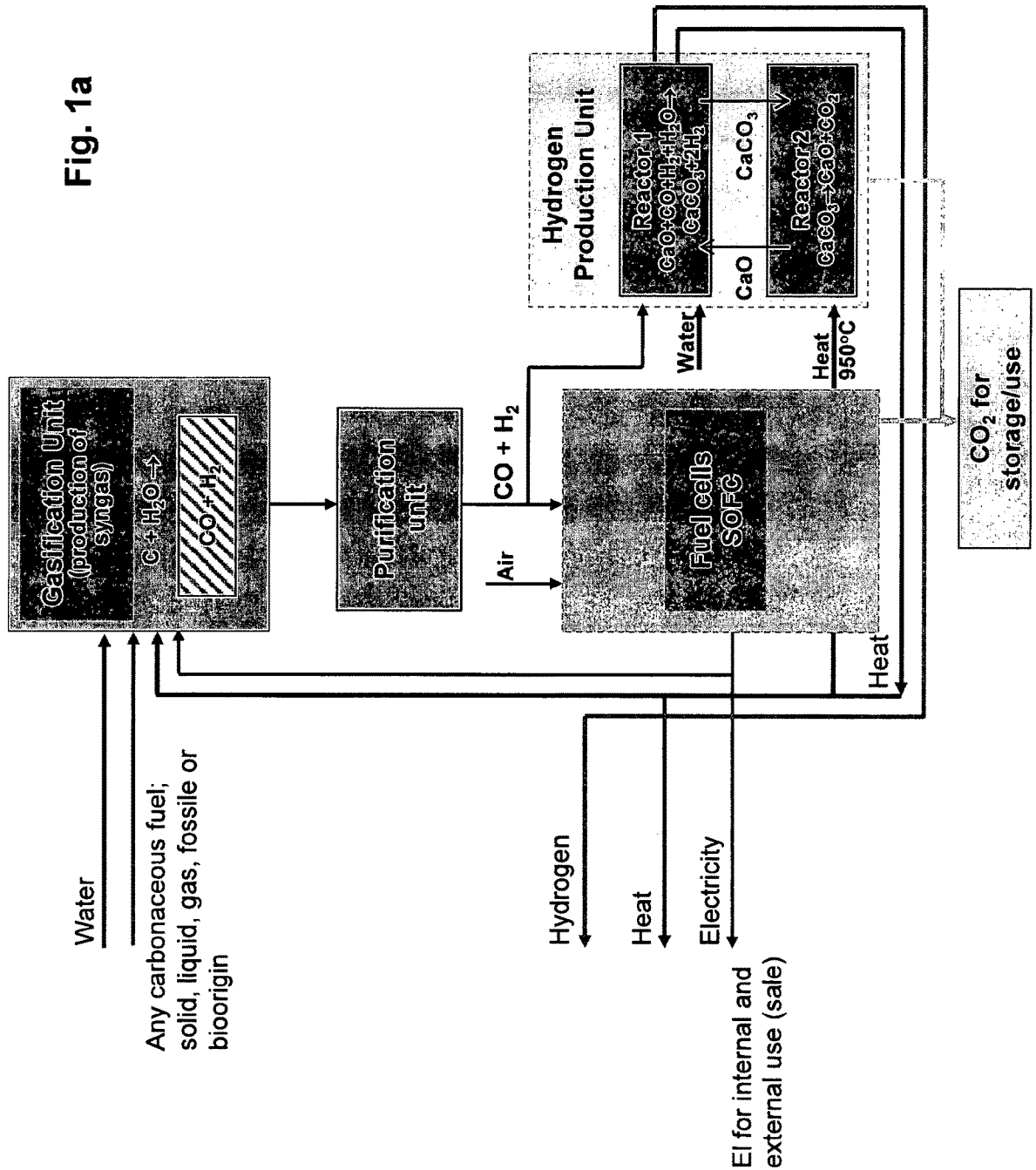

(51) Int. Cl.
  *C01B 3/34* (2006.01)
  *H01M 8/0612* (2016.01)
  *H01M 8/04007* (2016.01)
  *H01M 16/00* (2006.01)
  *H01M 8/0662* (2016.01)
  *C10J 3/00* (2006.01)
  *C01B 3/56* (2006.01)
  *B01D 53/62* (2006.01)

(52) U.S. Cl.
  CPC .............. *C01B 2203/042* (2013.01); *C01B 2203/0425* (2013.01); *C01B 2203/0475* (2013.01); *C01B 2203/066* (2013.01); *C01B 2203/0833* (2013.01); *C01B 2203/1241* (2013.01); *C01B 2203/84* (2013.01); *C01B 2203/86* (2013.01); *C10G 2300/1011* (2013.01); *C10J 2300/0916* (2013.01); *C10J 2300/0943* (2013.01); *C10J 2300/1612* (2013.01); *C10J 2300/1646* (2013.01); *C10J 2300/1665* (2013.01); *C10J 2300/1681* (2013.01); *Y02C 10/04* (2013.01); *Y02E 50/18* (2013.01); *Y02P 20/13* (2015.11); *Y02P 20/145* (2015.11); *Y02P 20/152* (2015.11); *Y02P 30/20* (2015.11); *Y02P 30/30* (2015.11)

(56) References Cited

U.S. PATENT DOCUMENTS

| | | |
|---|---|---|
| 2004/0040312 A1 | 3/2004 | Hoffjann et al. |
| 2004/0261617 A1* | 12/2004 | Stewart ............... 95/96 |
| 2005/0003247 A1* | 1/2005 | Pham ............... 429/17 |
| 2005/0123810 A1* | 6/2005 | Balan ............... C01B 3/501 |
| | | 429/411 |
| 2005/0158594 A1* | 7/2005 | Ahmed ............... C01B 3/32 |
| | | 48/197 R |
| 2007/0099038 A1 | 5/2007 | Galloway |
| 2012/0171588 A1* | 7/2012 | Fan ............... C01B 3/063 |
| | | 429/418 |

* cited by examiner

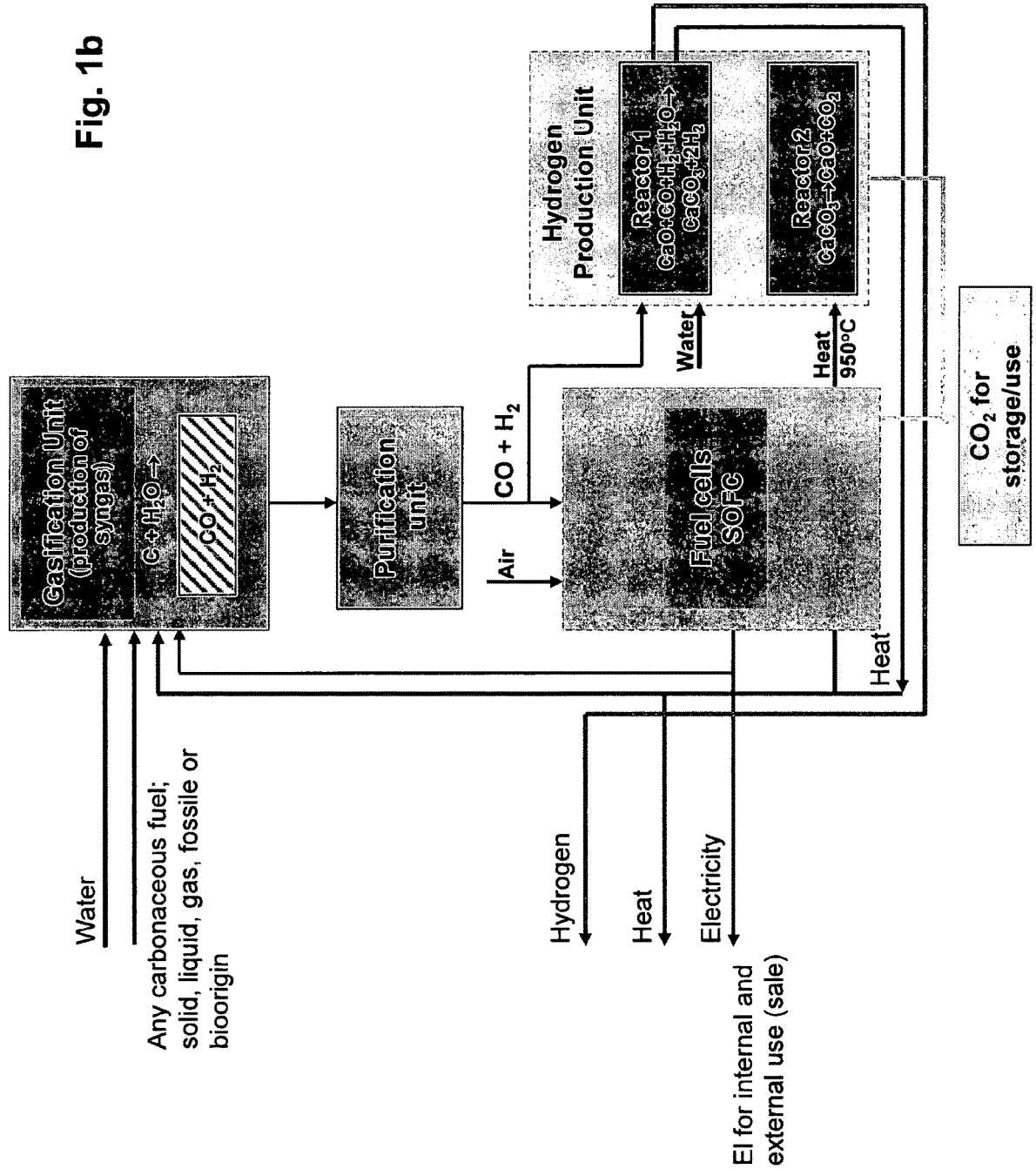

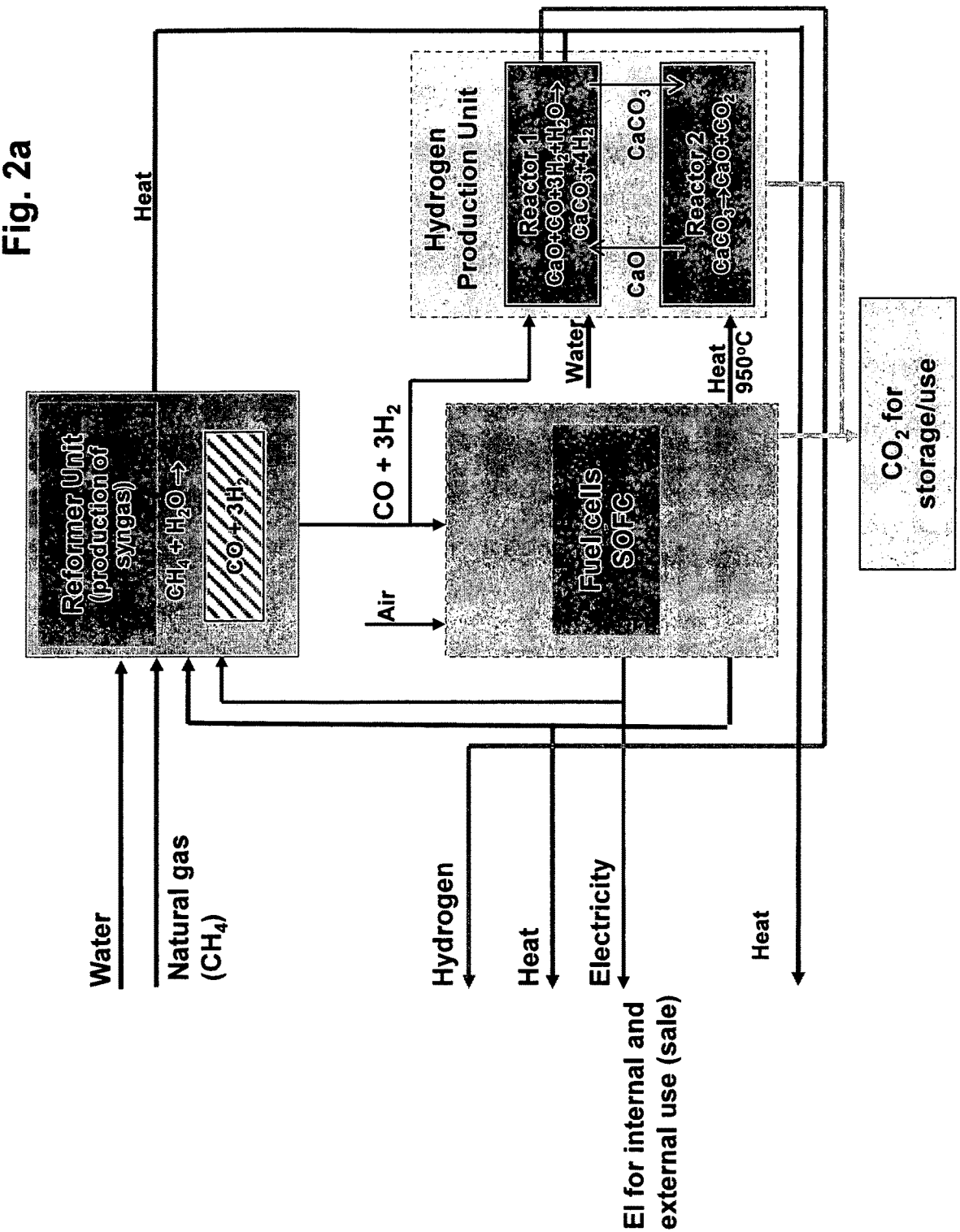

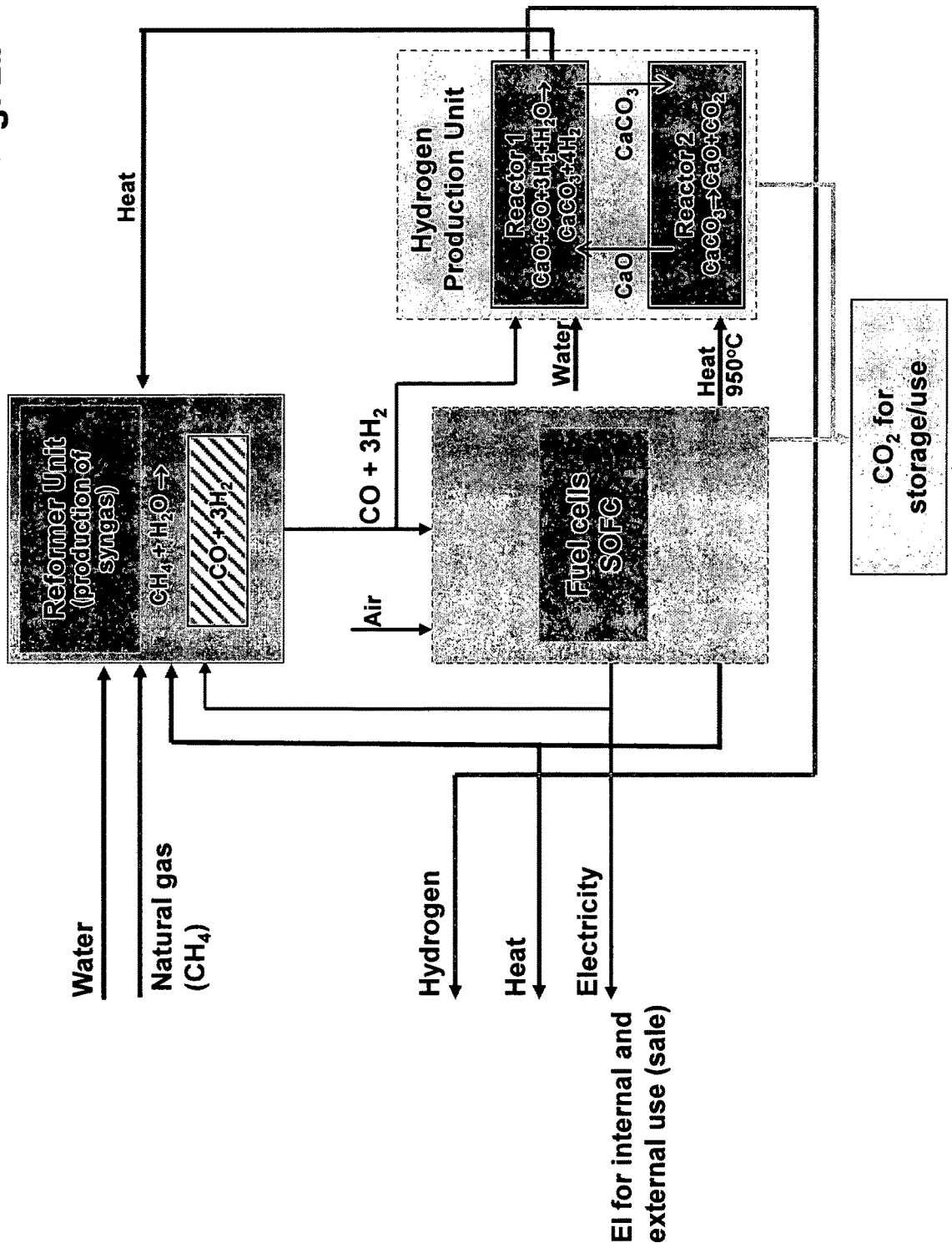

Distributed heat, electricity and hydrogen production

METHOD AND DEVICE FOR SIMULTANEOUS PRODUCTION OF ENERGY IN THE FORMS ELECTRICITY, HEAT AND HYDROGEN GAS

This application is a 371 of PCT/NO2010/000400, filed on Nov. 3, 2010, which claims priority to Norwegian patent application number 20093575, filed Dec. 22, 2009, which is incorporated herein by reference.

The present invention relates to a method and a device for simultaneous production of energy in the forms electricity, heat, and hydrogen gas, based on syngas and/or natural gas, which in turn may be derived from a number of primary energy sources.

BACKGROUND

The worlds demand for electric power, heat and hydrogen will in the foreseeable future be based on gaseous, liquid or solid fossil fuels. Thus international concerns over global warming would be increasingly focusing on carbon capture and storage (CCS). Development of environmentally friendly, cost and energy efficient technologies, including handling of the CCS-issue, is therefore inevitable.

One of the major challenges in this connection is the recovery and upgrading of extra heavy oil and bitumen. Because of a simultaneous global increase in the fossil energy demand and decrease in the conventional resources, the oil industry will turn to unconventional resources. It should in this connection be mentioned that there are more than 4000 billion barrels of Extra Heavy Oil (EHO) and Bitumen accumulated world wide. The recovery and upgrading of these resources, for example from tar-sands, are very energy intensive processes with strong impact on the environment.

In the tar-sand industry natural gas is to day primarily used to generate steam (for example for SAGD (Steam assisted gravity drainage)), electric power and to produce hydrogen for upgrading processes.

Concerns over long-term natural gas cost and supply have however motivated operators to consider gasification based energy production for future projects. Commercial bitumen upgrading processes generate high-sulphur pet-coke asphaltene by-products, which are currently stock-piled. These opportunity fuels could (together with coal and/or an untreated portion of the bitumen, if necessary) be gasified to produce hydrogen, electric power and steam, thus potentially eliminating the need for valuable natural gas.

The first of such gasification based systems is currently in an advanced stage of construction in Alberta, Canada. The Long Lake project owned by Opti-Nexen Canada, Inc. is a fully integrated bitumen extraction and upgrading facility fuelled by gasification of asphaltene residue. (G. Ordorica-Garcia et. al, Energy Procedia 1 (2009) 3977-3984: CO2 Capture Retrofit Options for a Gasification-based Integrated Bitumen Extraction and Upgrading Facility). The gasification units provide hydrogen required for upgrading and syngas fuel for power and steam production in a co-generation plant, resulting in almost fully energy self-sufficient operations.

However, use of natural gas and/or syngas results in release of substantial amounts of $CO_2$ into the atmosphere, contributing to global warming.

To day, application of CCS-technology, within the oil-sand industry, is primarily targeted towards hydrogen production- and electrical power plants, as they are the largest point sources of $CO_2$. Future integrated gasification based plants (production of; syngas, steam, electric power and hydrogen (for upgrading)) will also have to meet the CCS-challenge. If $CO_2$-capture, in such cases, is based on to-days available technologies, this will have a substantial impact on capital and operating costs, as well as plant performance (particularly if retrofitting is needed).).

A method and apparatus for "Hydrogen Production From Carbonaceous Material", has been patented by Lackner et al, WO 01/42132 A1. This apparatus performs; Gasification of coal by hydrogenation in a gasification vessel. This process stage is followed by hydrogen production from methane and water that is driven using a calcium oxide carbonation reaction in a carbonation vessel. Such a process is often referred to as; Hydrogen production by sorption enhanced steam methane reforming (SE-SMR). In the gasification step (Lackner et al.) coal (or syngas) is hydrogenated with hydrogen to produce a gaseous reaction product consisting primarily of methane. This gaseous reaction product is conveyed to the carbonation vessel, where it is reacted with water and calcium oxide to produce hydrogen and solid calcium carbonate and to remove carbon dioxide from the product gas stream.

The Lackner et al.-process provides no extra heat for example for SAGD. Thus the process lacks versatility desirable for a lot of interesting applications. Furthermore all the $CO_2$ of the process system is captured in a SE-SMR-process. This may not be cost effective in applications where large amounts of external heat combined with the necessary amounts of hydrogen and electricity are needed, for example in the tar sand industry.

The publication WO 2004/025767 (Vik et al.) discloses a plant for the production of electricity from a hydrocarbon containing flow. According to one embodiment a SOFC is used for producing the electricity. The process involves reforming of the fuel in order to produce hydrogen before separating it from the other components to use pure hydrogen as the feed to the fuel cell. $CO_2$ produced during reforming may be captured for subsequent use or storage. The process of Vik et al. is targeted towards applications where excess heat is not needed, and where high efficiency for the co-production of electricity and hydrogen only is the primary object.

Hence new technology, preferably a game change, focused on energy optimization, $CO_2$-capure and sub-surface storage or use (f. ex. EOR) is needed.

OBJECTIVES

It is thus an objective of the present invention to provide a method that allows cost and energy efficient sustainable recovery of and energy production from heavy oil and bitumen as well as sustainable energy production from biomasses and organic waste in industrial scale.

It is a derived object to provide the above with means that provides efficient carbon dioxide capture and storage and that allows a highly versatile production of energy in the forms electricity, hydrogen and heat. By "versatility" in this respect is understood that the ratio of the amounts of these energy forms may be varied within wide limits by simple change of parameters in the inventive process.

DISCLOSURE OF INVENTION

The above mentioned objects are achieved by the method according to the invention as defined by claim 1.

According to another aspect the invention concerns a device for performing the method as defined by claim 16.

Preferred embodiments of the invention are disclosed by the dependent claims.

It should generally be noted that when reference is made to "a fuel cell", "a SOFC", or "at least one fuel cell or SOFC", there may in industrial cases be a number of stacks of fuel cells.

While "natural gas" commonly refers to as a methane rich gas recovered from subterranean formations, "natural gas" is in the context here presented intended to cover any methane rich gas irrespective of its origin.

It should be noted that the term "primary SOFC" does not necessary mean that there is another (secondary) SOFC involved in the method or the device according to the invention. Presence of another (secondary) SOFC is an optional feature of the invention.

It should furthermore be noted that the cost-effective capture of $CO_2$ is a major advantage with the present technology and in the environmental situation today it is evident that $CO_2$ capture be included in any industrial plant based on the invention. Since the environmental situation, however, may change over time, and since the inventive method is beneficial with or without $CO_2$ capture, this feature is still, with respect to the SOFC unit termed an optional feature.

The present technology represents such a game-change technology and will give a major contribution towards the objects given above.

The concepts of the invention are all based on two major "components";
1. An SOFC Combined Heat and Power (CHP)-plant, based (directly) on syngas or natural gas.
2. A hydrogen gas production unit with integrated $CO_2$-capture (solid $CO_2$-absorbent (f. ex. CaO)) based on syngas (CO-shift reaction) or on natural gas (SE-SMR reaction; sorption enhanced steam methane reforming)

These two components provide heat for; the gasification units (production of syngas), steam for SAGD, the hydrogen production unit (regeneration of CO2-absorbent) and the upgrader, electricity for internal use in the total production facility and for sale to the local grid, and hydrogen for the upgrader (upgrading of bitumen from SAGD to syn-crude or more refined products).

The $CO_2$ may be captured in two or three different manners;
a) directly from the SOFC stacks (by burning the "afterburner"—gases in pure oxygen, reducing the energy efficiency by 2-3% only),
b) by making hydrogen of the syngas.

In the latter case $CO_2$ is captured by a $CO_2$-absorbent (f. ex. CaO) integrated in the CO-shift reaction. Pure $CO_2$ is released in a regeneration reaction (calcination of $CaCO_3$ to CaO and $CO_2$ (for storage or use)). The hydrogen is in this case partly used to feed the SOFC for production of heat and electricity and partly for use in the upgrader.
c) The $CO_2$ is captured by a combination of a) and b). In fact this might be the preferred most cost effective solution.

Figure 1C:
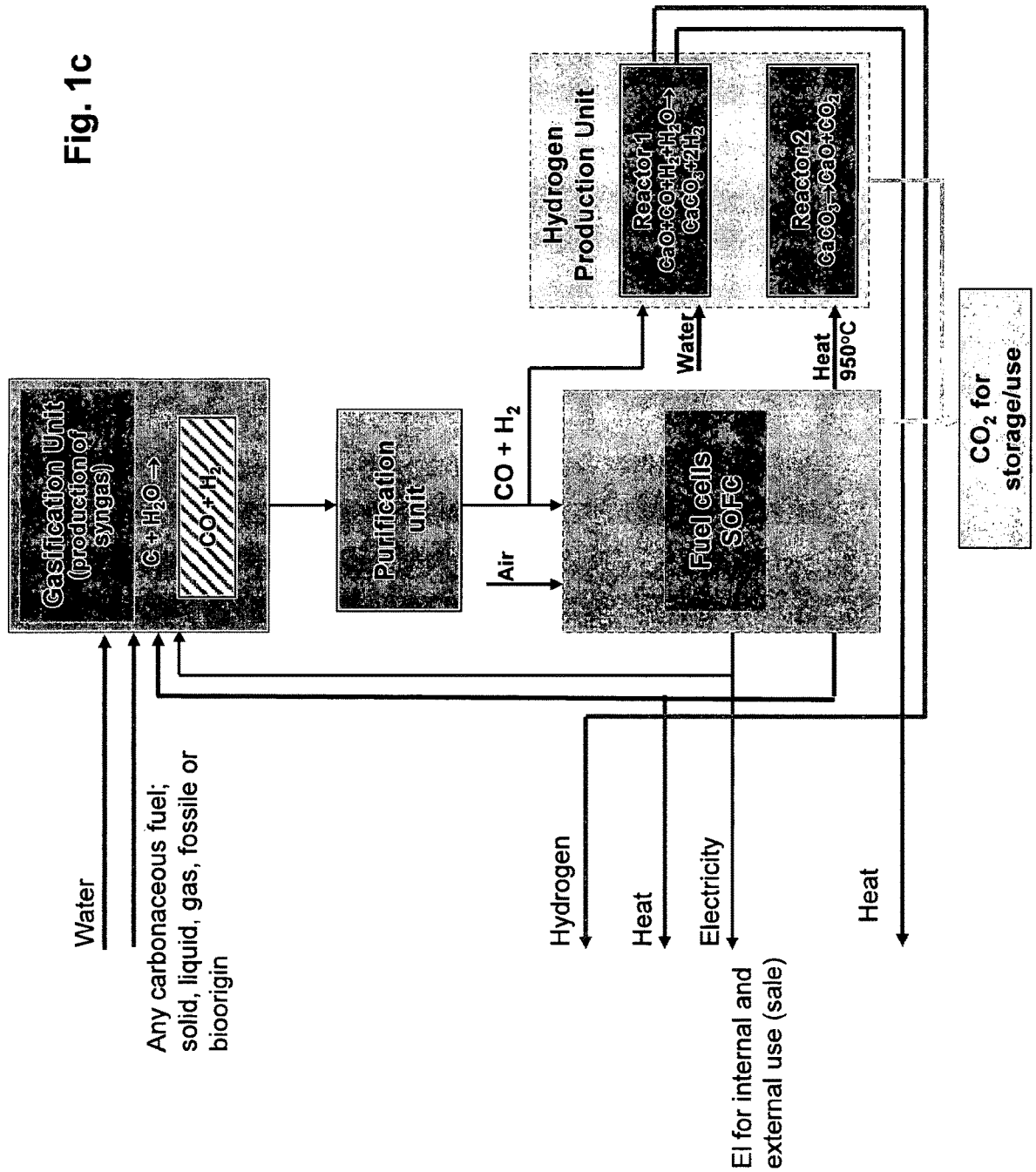
Figure 2C:
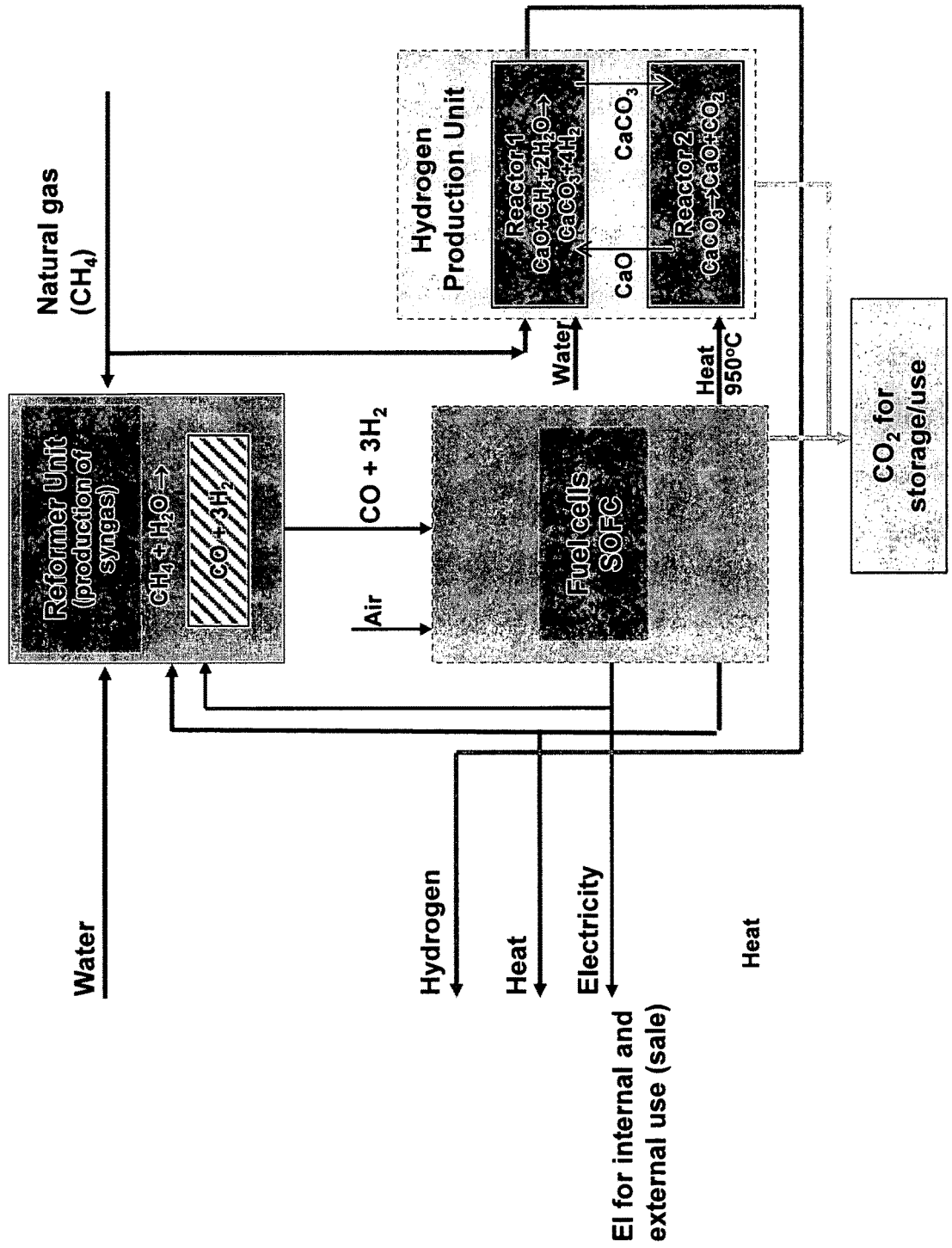
Figure 2D:
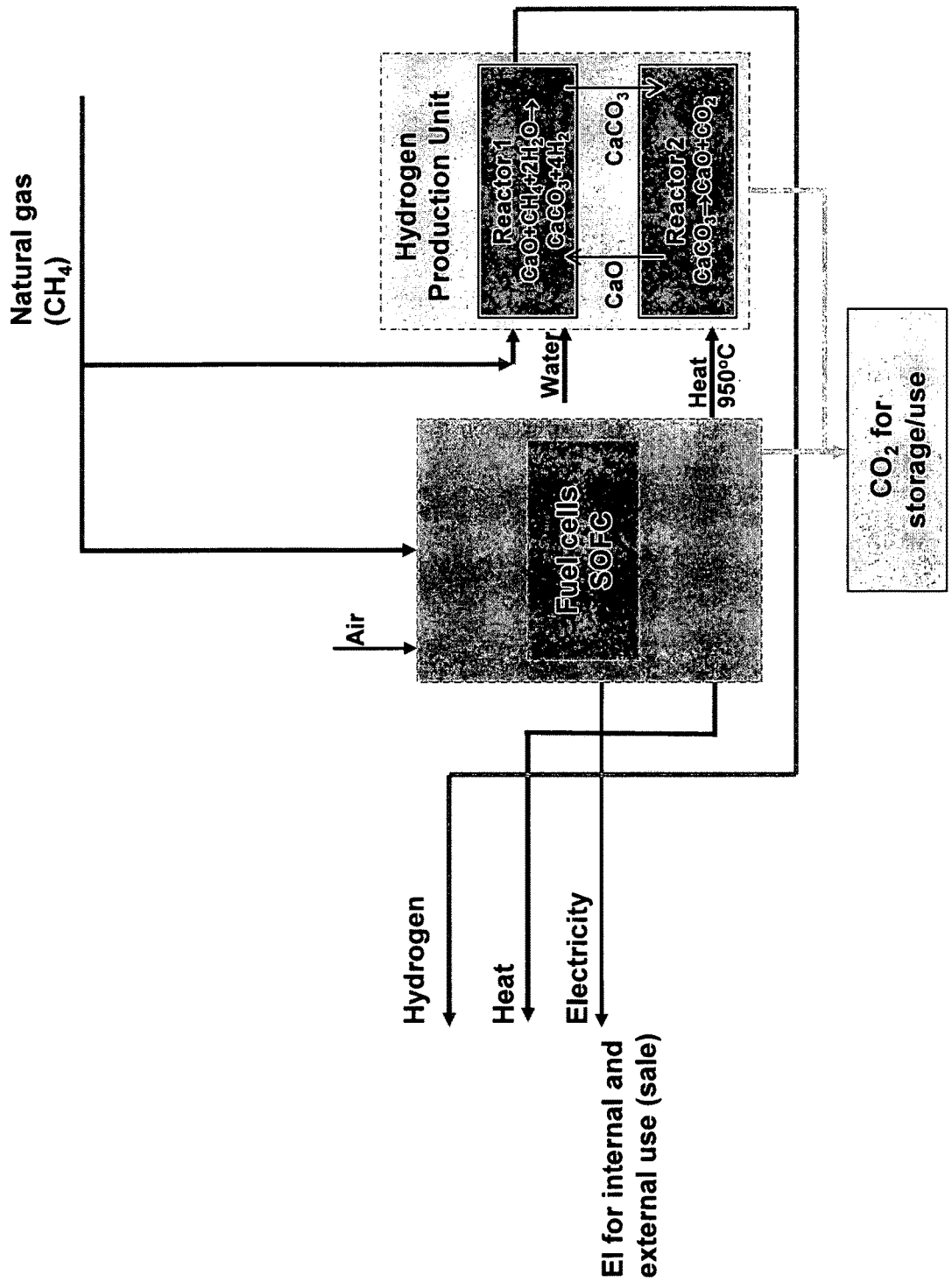
Figure 3A:
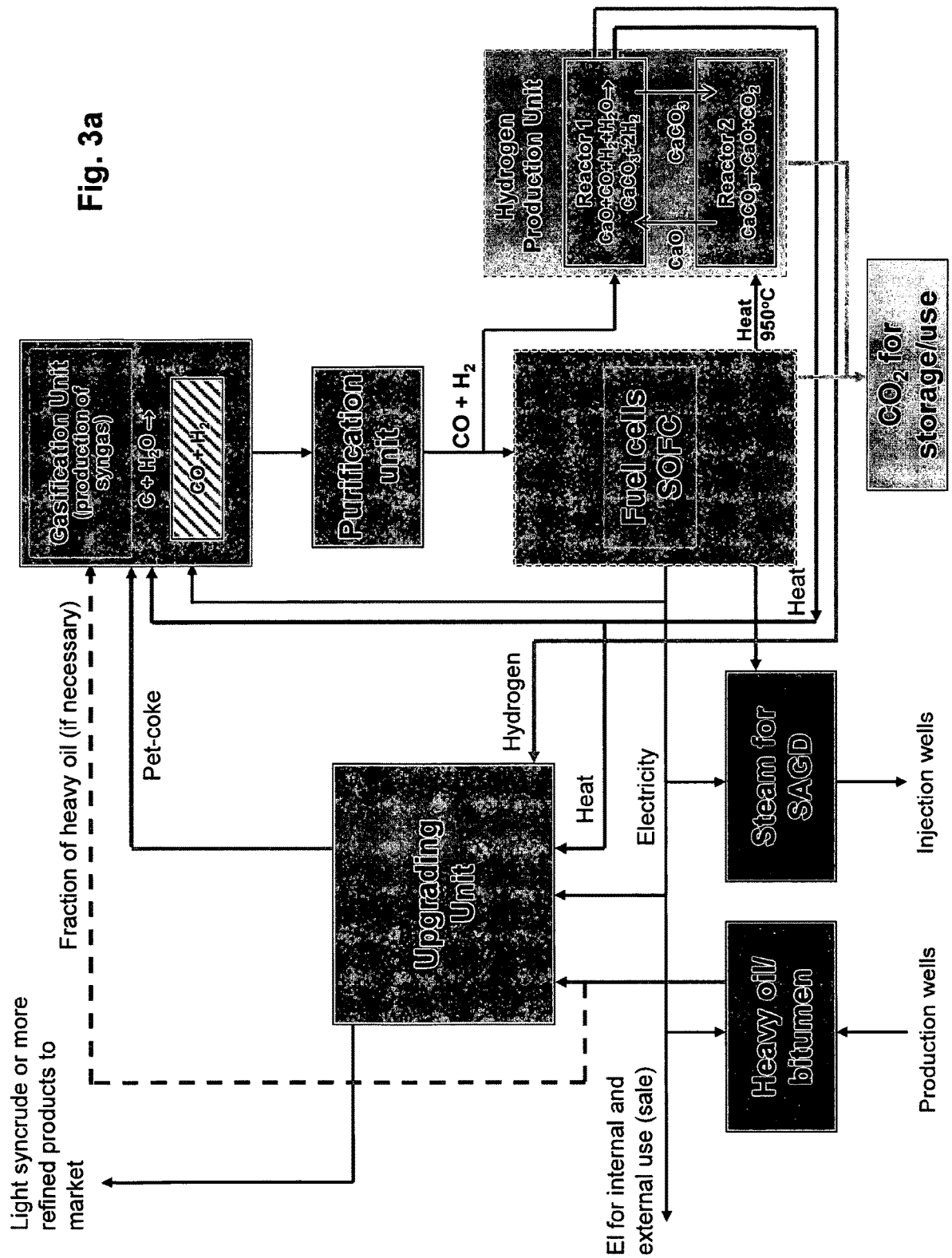
Figure 3B:
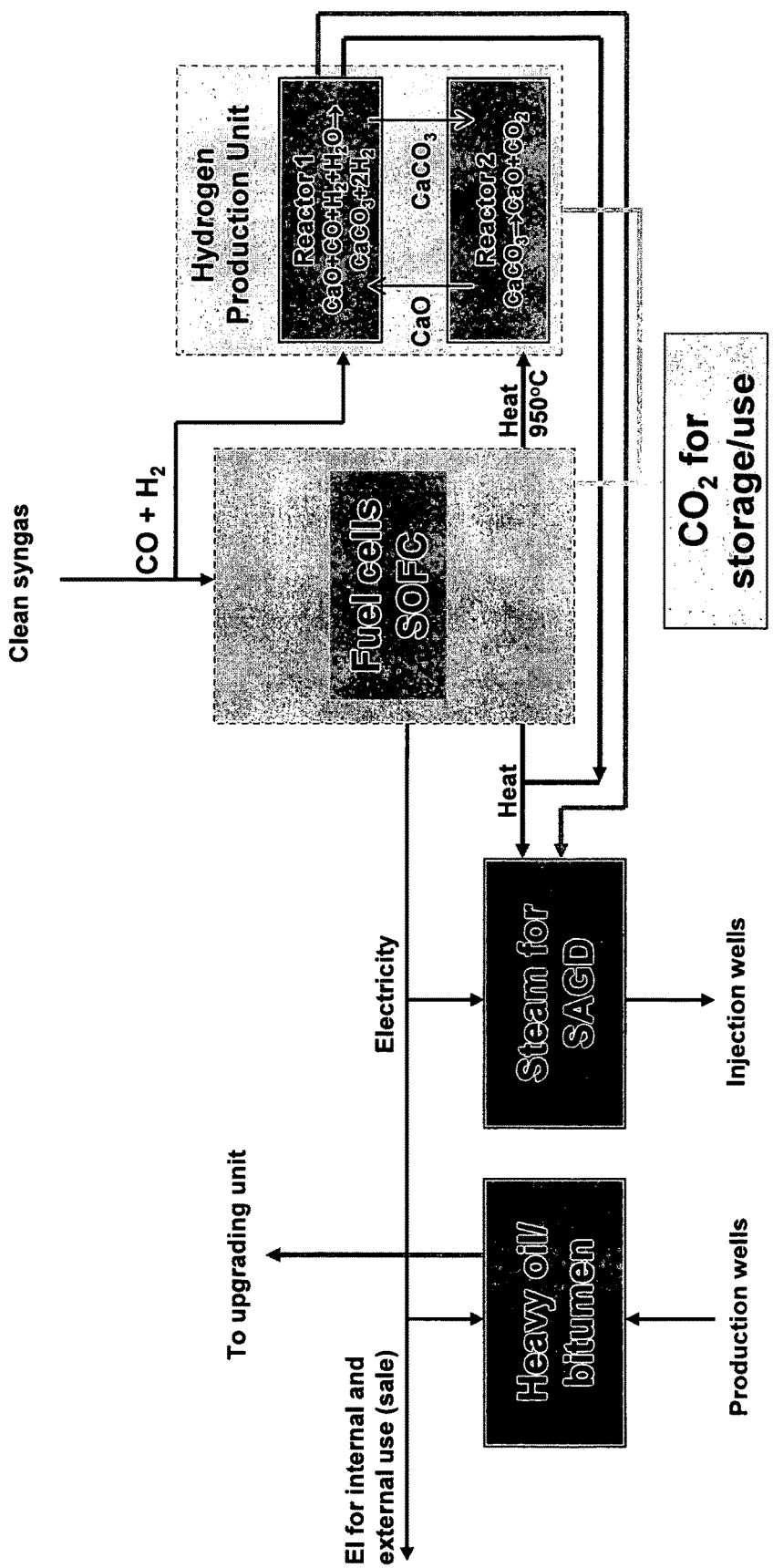
Figure 4:
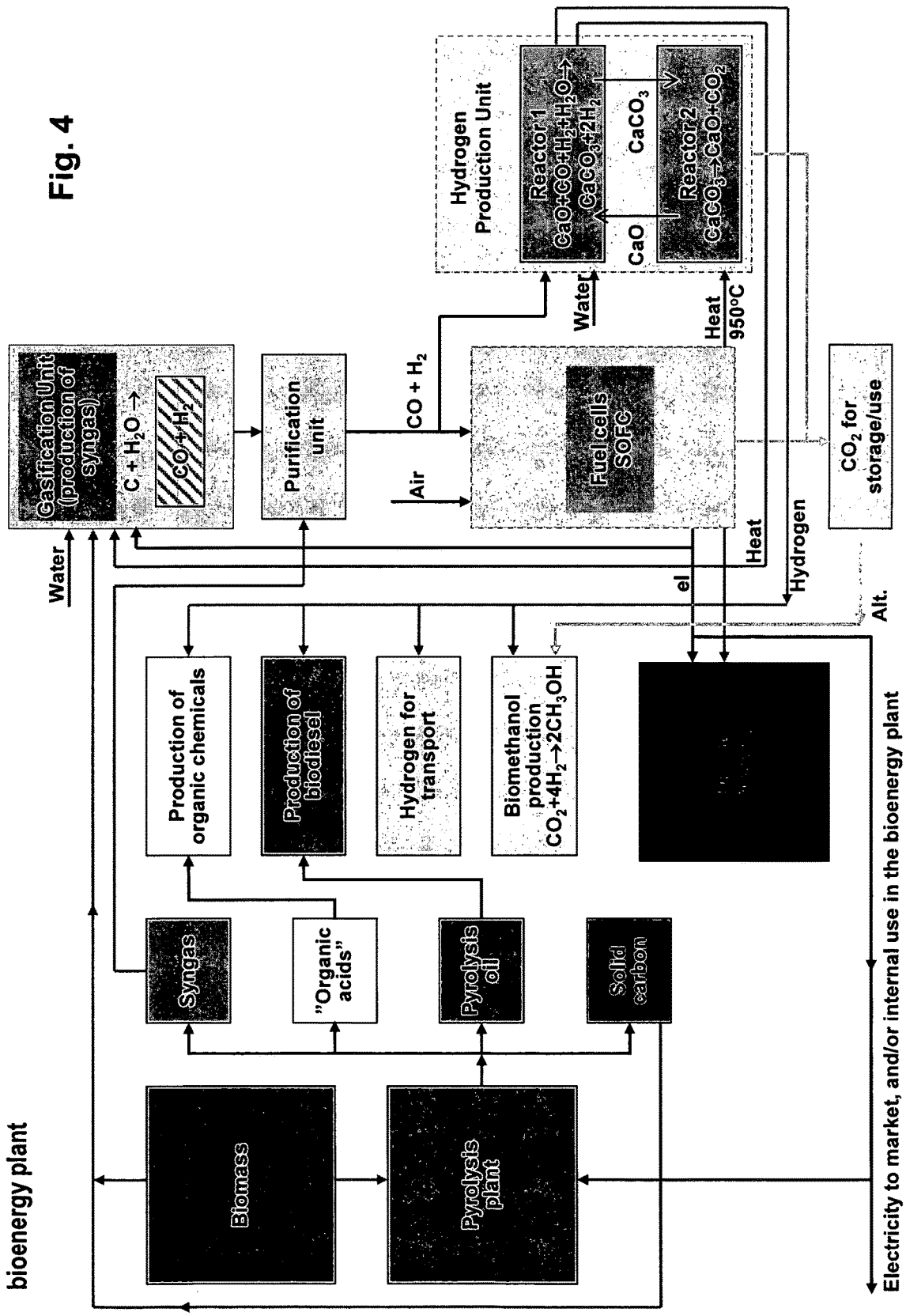
Figure 5:
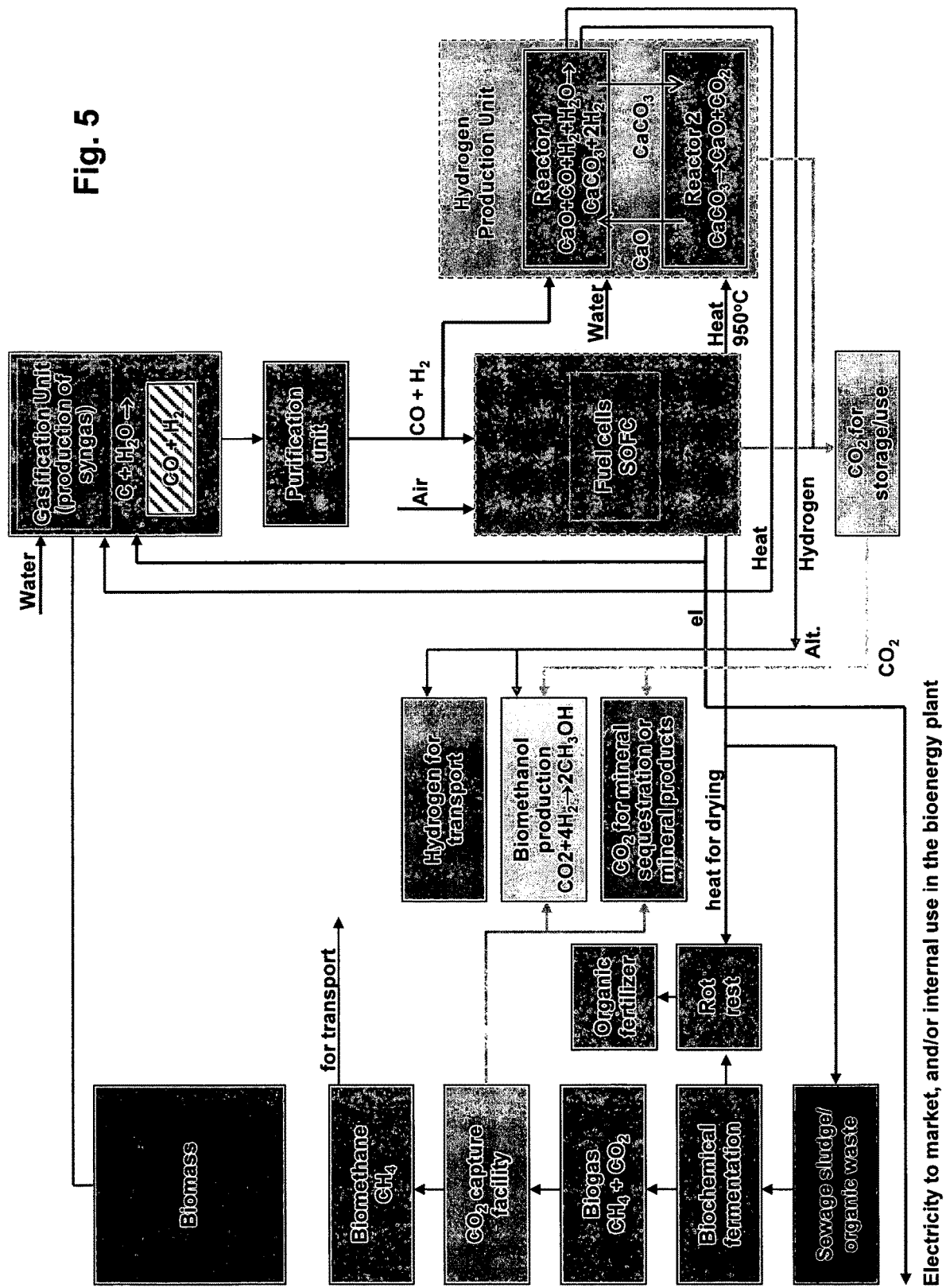

Different embodiments of the invention are illustrated below with reference to the enclosed drawings, where FIGS. 1a-c are schematic views of the principle of the present invention, not limited by application, FIG. 2a is a schematic view of the principle of the present invention, the primary energy source being natural gas, FIG. 2b shows a variant of the process shown by FIG. 2a, FIG. 2c shows another variant of the process shown by FIG. 2a, FIG. 2d shows yet another variant of the process shown by FIG. 2a, FIG. 3a is a schematic illustration of the present invention in an application in which heavy oil/bitumen is the primary energy source, FIG. 3b shows a distributed variant of FIG. 3a, FIG. 4 is a schematic illustration of the present invention in an application in which biomass is the primary energy source, FIG. 5 is a schematic illustration of the present invention in another application in which biomass is the primary energy source.

FIGS. 1a-c generally illustrate the principles of flexible production of the three energy components, electricity, heat, and hydrogen with integrated cost and energy efficient $CO_2$ capture.

FIG. 1a shows that carbonaceous fuel is fed to a gasification unit, heated by heat from the plant, in which the charge is converted to syngas. After being purified according to the relevant requirement, the syngas is divided into a first and a second feed gas flow. The ratio between the two is determined by the application in question and particularly by the requirement for hydrogen internally and externally. The first feed gas flow is directed to a fuel cell to produce electricity and heat. A person skilled in the art will readily know that air should be fed to one electrode of the fuel cell (SOFC) while the fuel is fed to the other. $CO_2$ is also produced in the fuel cell and captured in a manner to be described more thoroughly below. Worth noticing is that according to the present method the $CO_2$ capture merely reduces efficiency by 2-3% compared to a reduction between 5 and 10% by more conventional methods. The subsequent use of or disposal of $CO_2$ is not part of the present invention.

The second feed gas flow is directed to a hydrogen gas forming reactor system, in this embodiment represented by two reactors in series. In the first of the two reactors the CO part of the syngas is converted to hydrogen through a reaction with water and a catalyst/absorber system. In the shown embodiment the catalyst/absorber is CaO that is reacted to $CaCO_3$ thereby absorbing any $CO_2$ formed in the reaction. The second step is a step of regeneration of the absorber, which through release of $CO_2$ is converted back to CaO. Needless to say, the $CO_2$ thus released should be held isolated for later use. The regeneration step of the hydrogen gas forming reactor system is typically performed at higher temperature and/or at lower pressure than the hydrogen gas producing step.

The net reactions may be written as:

$CaO+CO+H_2O=CaCO_3+H_2$ (hydrogen production step)

$CaCO_3=CaO+CO_2$ (absorber regeneration step)

$CO+H_2O=H_2+CO_2$ (total process)

In the hydrogen production unit hydrogen is produced by a CO-shift reaction in a reactor (Reactor 1), where $CO_2$ is captured by a $CO_2$-absorbent (exemplified by CaO) resulting in almost pure hydrogen (95%+) in one process step (for most industrial purposes no further upgrading of hydrogen would be needed). Regeneration of the absorbent occur at high temperature (T=850-900° C.) in a regeneration reactor (Reactor 2), where pure $CO_2$ is released for storage or use. Regenerated absorbent is moved back to the hydrogen production unit. The two reactors (1 and 2), hydrogen production- and regeneration reactors, may consist of two fluidized bed reactors, where one reactor is dedicated for hydrogen production (Reactor 1) and the other reactor is dedicated for regeneration of the $CO_2$-absorbent (Reactor 2).

Attention is drawn to FIG. 1*b*. As an alternative the two reactors of the hydrogen gas forming reactor system may be two reactors in parallel (fixed bed reactors) in stead of two reactors in series (fluidized bed reactors). Use of two reactors in series allows continuous production and steady state conditions in each of the reactors, but also requires that solids have to be circulated between the reactors. If reactors are run in parallel, they are each used intermittingly in production modus and absorber regeneration modus. The temperature and possibly pressure will have to be changed back and forth, but the need for circulating solid materials is avoided. According to FIG. 1*b* there is no transfer of absorbent between reactor 1 and Reactor 2. Instead these reactors are run intermittingly. In one period of time Reactor 1 is used for hydrogen production while absorbent is regenerated in Reactor 2. In a following period of time the situation is vice versa.

Both steps of the hydrogen gas forming reactor system require heat, and are heated with heat formed in the SOFC. Heat from the SOFC is also used to heat the gasification unit. Should there be a temporary drop in demand for hydrogen, externally or internally, the ratio between the first and the second feed gas flow may rapidly be altered. As an option, parts of the hydrogen produced may also be used to generate heat and electricity in a (at least one) fuel cell.

The $CO_2$ capture from the fuel cell is arranged to be performed by combustion of the remaining fraction of fuel in the anode exhaust gas from the fuel cell in pure oxygen. Thus the exhaust contains only $CO_2$ and water vapour. The latter can be removed by condensation or other drying means, leaving pure $CO_2$ in the exhaust stream. The oxygen can be obtained by the use of an oxygen pump (electrochemically driven oxygen transport through a membrane) or an oxygen transport membrane driven by the partial pressure gradient between the air exhaust and the fuel exhaust.

As shown to the left of FIG. 1*a* and FIG. 1*b*, excess energy is distributed from the plant for external consumption. It is also indicated that excess energy is transferred from the hydrogen gas producing reactor to the gasification unit.

FIG. 1*c* shows an embodiment rather similar to FIG. 1*b*, the sole difference being that the SOFC provides all the heat to the gasification unit, while the excess heat from the hydrogen gas forming reactor is delivered externally.

FIG. 2*a* shows an embodiment which is similar to FIG. 1 but where the primary energy source to the plant is natural gas, mainly methane, and where the gasification unit therefore is replaced by a reformer unit arranged to convert the methane to syngas. All other features of FIG. 2*a* are similar to FIG. 1. When starting from natural gas, a hydrogen rich syngas is obtained. Heat is supplied from the SOFC to the regeneration reactor of the hydrogen gas forming reactor system, to the reforming unit and for external delivery. Excess heat from the reformer unit may also be delivered externally.

FIG. 2*b* shows an embodiment of FIG. 2*a* in which the heat transportation between the different units are somewhat different while the principles of the process remain the same ones in the sense that the heat required internally in the process is generated by the fuel cell. Here excess heat from the hydrogen gas forming reactor system (the production reactor thereof) is supplied to the reforming unit.

FIG. 2*c* shows yet another variant of the method according to the present invention in which natural gas is the primary energy source. In this case, however, natural gas is fed as such to the hydrogen gas forming reactor system while the reformer unit is arranged to convert only the first feed gas flow to syngas. Again heat from the fuel cell is used to heat the reformer unit as well as the absorber regeneration part of the hydrogen gas forming reactor system. Required heat for the hydrogen production may be supplied solely by the warm, regenerated absorber and the exothermal absorber reaction.

FIG. 2*d* shows still another variant of the method according to the present invention in which natural gas is the primary energy source. Here natural gas is fed as such to both the fuel cell and to the hydrogen gas forming reactor system. Hence, no syngas is involved in the process according to this variant. The heat transportation is generally the same, but in this case no reformer unit is involved, at least not in the neighbourhood of the plant. The components of excess energy for external use are shown to the left.

In all the variants shown in 2*a*-2*d* the hydrogen gas forming reactor system may be either fluidized bed reactors running at steady state or fixed bed reactors running intermittingly. I all the variants $CO_2$ from the SOFC is captured directly from the stacks while $CO_2$ from the hydrogen gas forming reactor system is captured by an absorbent and released in the regeneration unit.

While the core of the invention is presented above, some relevant applications are illustrated below.

There are many industrial situations, or integrated industry clusters, where flexible amounts of cost and energy effective production of heat, electric power and hydrogen are needed. A major challenge in such cases is to obtain cost and energy efficient $CO_2$-capture at the same time.

This challenge is met by the present invention.

Petroleum refineries and integrated production and upgrading facilities in the tar sand industry are in this connection examples of obvious cases. In addition to applications related to fossil energy (and feedstock) production, interesting applications also occur in relation to use of fuel/feedstock of different bio origin.

To illustrate this point, three different possible scenarios (or examples) are presented in the following, referring to drawings 3-5. These scenarios are all based on production and use of flexible amounts of electricity, heat and hydrogen with integrated $CO_2$-capture, which can be tailor-made for any purpose or need. It should however be pointed out that the present scenarios are examples only, the possibilities, combinations and flexibility followed by the use of the present invention give almost "unlimited" options to integrated industry clusters, or to situations where several industrial situations are "linked" together, where waste from one industrial set up or application, may give an interesting valuable feedstock to another.

FIG. 3*a* shows a more complete application system, though very schematic, starting from heavy oil/bitumen or tar sand (hereafter for short: bitumen) as the primary energy source. As a person skilled in the art will know, there are challenges involved in bringing the bitumen to the surface, and heat—possibly in the form of steam—is required in order to recover the bitumen from sub-surface. One such method is termed SAGD (steam assisted gravity drainage). The recovered bitumen is upgraded in an upgrading unit and the intermediate product, pet-coke, is charged to a gasification unit (like the one in ig. 1) to obtain syngas. Thus, in this case, there are three energy demanding steps required before obtaining the gas to be fed to the fuel cell. Still the core of the process is the same and the heat required for the mentioned internal steps is provided by the (at least one) fuel cell. The hydrogen for the upgrading unit is provided by the hydrogen gas forming reactor system. This system illustrates a more complex use, also internally, of the energy components involved, thus elucidating the advantages of a system that is versatile with respect to its inherent ability inherent to adapt or change the ratio between the energy components in accordance with the application in question or even with changing needs over time for one and the same application. It should be noted that according to this embodiment/application, the present invention allows a sustainable energy production from rather cheap raw materials.

One possible version of the tar-sand scenario would be to have distributed heat, electricity and hydrogen production amounts tailor made for the need in well injection (SAGD) and production clusters. Syngas for the distributed units is supplied from a central plant (FIG. 3A). The hydrogen production of the distributed units can if needed be limited or small (f. ex. 10-0%). The hydrogen can be used for in situ upgrading (as f. ex. in; WO 2008/058400 A1: Catalytic down-hole upgrading of heavy oil sand bitumen), for fuelling of dedicated SOFC-stacks for production of electricity or be transported in a pipeline system to the upgrader in the central plant.

It should be noted that in case the pet-coke formed is not formed in amounts sufficient to make the process run, it may be combined with other carbonaceous fuels, such as coal, untreated bitumen, biomass or even natural gas.

FIG. 3b is similar to FIG. 3a but does not include the whole "picture". The point illustrated by FIG. 3b is that parts of the plant (a sub-plant) may be distributed to local sites according to the relevant need while other parts, specifically the upgrading unit, gasification unit and purification unit (not shown in FIG. 3b) may be arranged separately at a central location and serving any number of distributed sub-pants such as the one shown in FIG. 3b.

FIG. 4 illustrates stand alone bio energy plant with integrated "bio refinery"—scenario.

FIG. 4 indicates how a combined electric power-, heat- and hydrogen production plant according to the present invention can give the necessary heat for district heating (and for a pyrolysis plant if needed), electricity for the total bio energy/bio refinery site and hydrogen for upgrading purposes (production of organic chemicals and bio diesel), production of bio methanol and for supply of hydrogen to the transport sector. Captured $CO_2$ may be used in production of bio methanol, providing $CO_2$ neutral fuel for the transport sector, or for any other suitable use.

Syngas and solid carbon fuels the energy-, hydrogen production system, together with the necessary biomass. The biomass may also be the feedstock for a pyrolysis plant. All the bio $CO_2$ is captured, which gives double "bonus" if used in a sustainable manner, or if it is stored. The individual processes taking place in the boxes in the three leftmost columns of FIG. 4 is not explained in detail since they are not as such part of the present invention. What is important in the present context is how the method according to the present invention allows intimate interaction with such processes through supply of adapted amounts of the energy required in the three forms mentioned several times above.

FIG. 5 illustrates sand alone energy and hydrogen production system integrated in a bio gas production plant.

FIG. 5 shows how a combined electric power-, heat- and hydrogen production plant according to the present invention may give the necessary heat for initial heating of organic waste/sewage sludge, for drying purposes and other use on the site, electricity for the total bio gas production site (including necessary power for $CO_2$-capture from the biogas) and for sale to the local grid and hydrogen for production of bio methanol, based on $CO_2$ from the biogas and/or from the stand alone energy and hydrogen production system.

The bio-methane (from the biogas) may be used for hydrogen production. If, however, the $CO_2$ is separated from the biogas for production of vehicle grade methane, this methane would most likely be used directly in the transport sector. Fuel or syngas for the energy hydrogen production plant would be made from suitable biomass. Again, all the bio $CO_2$ is captured, giving double "bonus" if used or stored. And again, the individual processes on the left hand side of the drawing are not explained to any detail here, since they as such are not part of the present invention. The interesting part in the present context is the ability of the method according to the present invention to adapt to such complex systems of energy demanding process units, providing sustainable delivery of energy in the forms required by each process.

A total production plant for gasification-based integrated bitumen extraction and upgrading facility, based on the present invention, can thus achieve the optimal combination of the necessary amounts of heat, electricity and hydrogen, tailor-made for any heavy oil/bitumen project. The total process is in addition energy self-sufficient based on syngas from gasified pet-coke/upgrading residue (or untreated bitumen) with very energy efficient integrated $CO_2$ capture.

It should in addition be noted that the flexibility or versatility of the total system also applies to applications where coal, biomass and organic waste, or any other carbon containing material for that matter, constitutes the primary energy source.

In some preferred embodiments of the invention the carbonaceous gas is syngas. In other preferred embodiments the carbonaceous gas is natural gas or other methane rich gases.

The syngas and/or natural gas may be derived from any source, but it is preferred that it is at least partially derived by recovery of and upgrading of heavy oil, bitumen, or other carbon containing fuels wherein the heat requirement for the upgrading is at least partially provided by at least one SOFC. The upgrading mentioned typically involves gasification.

Depending on the type of absorber used in the hydrogen gas forming reactor system, water is usually fed to the reactor system along with the feed gas, though the two need not be combined or mixed prior to being charged to the reactor system.

The heat required for the regeneration reactor of the hydrogen gas forming reactor system is typically, at least partially, provided by at least one SOFC.

In some embodiments the syngas is at least partially derived from biomass, or it may be produced by reforming natural gas.

In some embodiments the carbonaceous gas is a gas rich in methane ("natural gas") being derived from one or more of the sources biomass and organic waste. The fraction of natural gas being charged to the primary SOFC, may in some embodiments first be reformed to syngas.

In order to obtain the desired versatility of the process, the ratio between the first feed gas flow and the second feed gas flow is made in accordance with the need for hydrogen in the application in question.

The hydrogen gas forming reactor system is chosen among: a) a reactor system comprising two reactors in parallel, each operated intermittingly in production modus and absorber regeneration modus respectively, and b) a reactor system comprising two reactors in series, the first reactor continuously operating in production modus and the second reactor continuously operating in absorber regeneration modus.

The temperature in the production modus of the hydrogen gas forming reactor system is typically maintained between 500 and 650° C. The temperature in the absorber regeneration modus is typically maintained between 800 and 950° C. The pressure in the absorber regeneration modus is maintained at a lower level than the pressure in the production modus.

In the preferred version of the present invention necessary heat, electric power and hydrogen is delivered by a "Combined Heat and Power" (CHP) SOFC facility, fuelled directly by syngas, combined with a separate hydrogen production unit, based on syngas as feed. In the hydrogen production unit CO2 is captured by a CO2-absorbent (f. eks CaO), while the CO2 from the CHP-SOFC is captured by an energy and cost effective post combustion method. (An optional version is to fuel or feed a dedicated part of the SOFC-stacks with hydrogen).

QUANTITATIVE EXAMPLES

The following table illustrates the versatility of the present method, by showing

| Fraction to $H_2$ gas forming reactor | Fuel utilisation in fuel cell | Cell voltage | Energy produced (relative amounts) | | |
|---|---|---|---|---|---|
| | | | Electricity | $H_2$ | Heat |
| 0.1 | 0.45 | 0.6 | 24% | 13% | 63% |
| 0.1 | 0.7 | 0.65 | 40% | 13% | 47 |
| 0.1 | 0.9 | 0.85 | 67% | 13% | 20 |
| 0.26 | 0.45 | 0.6 | 20% | 33% | 47% |
| 0.26 | 0.7 | 0.65 | 33% | 33% | 34% |
| 0.26 | 0.9 | 0.85 | 55% | 33% | 12% |
| 0.5 | 0.45 | 0.6 | 13% | 63% | 24% |
| 0.5 | 0.9 | 0.7 | 31% | 63% | 0% |
| 0.7 | 0.6 | 0.6 | 8% | 89% | 4% |
| 0.7 | 0.6 | 0.6 | 11% | 89% | 0% |

The calculations are based on syngas produced by reacting carbon with water:

$$C+H_2O \Longrightarrow CO+H_2$$

The electricity production is given by:

Electricity production=$4*F*$Cell Voltage*Fuel Utilisation in fuel cell*(1−Split)

where F=Faradays constant.
and Split=Fraction to $H_2$ gas forming reactor
The hydrogen production is given by:

Hydrogen production=Split*$2*dH\_H_2$ where $dH\_H_2$=heating value of $H_2$.
The net heat production is given by:

Heat=$dH\_C$−Electricity production−hydrogen production where $dH\_C$ is the heating value of carbon.

The examples above illustrate the versatility of the device according to the present invention without testing its barrier. Hence, a variation in heat production (relatively) from 0% to 63% of the total energy produced is shown; a variation in the relative $H_2$ production spans from 13 to 89% while energy in the form of electricity is illustrated in relative amounts between 8 and 67%.

The method as described provides a sustainable and uniquely versatile production of energy from a number of energy resources that man will depend on in the foreseeable future, of which the ability to capture and control all $CO_2$ produced is one essential—yet not decisive—aspect.

The invention claimed is:

1. A method for simultaneous production of energy in the forms of electricity, hydrogen gas, and heat from a carbonaceous gas comprising at least one of syngas or a gas rich in methane, the method comprising:
providing a single source of feed charge of carbonaceous gas comprising at least one of syngas or a gas rich in methane,
continuously dividing the single source of feed charge of the carbonaceous gas into a first feed gas flow and a second feed gas flow,
charging the first feed gas flow to a primary SOFC to produce electricity in an amount C, heat, and $CO_2$,
charging the second feed gas flow in parallel to the first feed gas and supplying an amount A of heat produced by the SOFC to a hydrogen gas forming reactor system to produce hydrogen in an amount B and $CO_2$,
capturing the $CO_2$ formed in the hydrogen gas forming reactor system by use of CaO as an absorbent, and
regenerating the CaO absorber in a step at least partially heated by the SOFC,
wherein the respective amount A of heat, amount B of hydrogen and amount C of electricity produced is variable by varying the ratio of the first feed gas to the second feed gas, and
wherein when the feed gas is a methane rich gas, the hydrogen is produced via sorption enhanced steam methane reforming (SE-SMR), and
wherein when the feed gas is syngas, the hydrogen is produced according to an overall reaction formula $CO+H_2=H_2+CO_2$, and
wherein when the feed gas is a mixture between a methane rich gas and syngas, the hydrogen is produced according to a combination of SE-SMR and an overall reaction formula $CO+H_2=H_2+CO_2$.

2. The method as claimed in claim 1, comprising controlling ratios between the first feed gas flow and the second feed gas flow in accordance with the need for hydrogen.

3. The method as claimed in claim 1, wherein the hydrogen gas forming reactor system is chosen among: a) a reactor system comprising two reactors in parallel, each operated intermittingly in production modus and absorber regeneration modus, respectively, and b) a reactor system comprising two reactors in series, the first reactor continuously operating in production modus and the second reactor continuously operating in absorber regeneration modus.

4. The method as claimed in claim 3, wherein the temperature in the production modus is maintained between 500 and 650°.

5. The method as claimed in claim 3, wherein the temperature in the absorber regeneration modus is maintained between 800 and 950°.

6. The method as claimed in claim 3, wherein the pressure in the absorber regeneration modus is maintained at a lower level than the pressure in the production modus.

7. A device for simultaneous production of energy in the forms of electricity, hydrogen gas, and heat from a carbonaceous gas comprising at least one of syngas or a gas rich in methane, the device comprising:
a single source of feed of carbonaceous gas comprising at least one of syngas or a gas rich in methane,
means to supply the single source of carbonaceous gas, means to divide the single source of carbonaceous gas into two fractions of variable relative amounts, an SOFC arranged to receive a gas from a first of the two fractions in order to produce electricity in an amount C, heat, and $CO_2$, means to immediately capture $CO_2$ formed in the SOFC, a hydrogen gas forming reactor system arranged in parallel with the SOFC for receiving gas from a second of the two fractions and receiving an amount A of heat produced by the SOFC to produce hydrogen in an amount B, means to distribute heat generated by the SOFC internally and externally, means to distribute electricity generated by the SOFC internally and externally, means to distribute produced hydrogen, and means to handle captured $CO_2$, wherein the respective amount A of heat, amount B of hydrogen and amount C of electricity produced is variable by varying the relative amount of the two fractions of gas, and wherein when the feed gas is a methane rich gas, the hydrogen is produced via sorption enhanced steam methane reforming (SE-SMR), and wherein when the feed gas is syngas, the hydrogen is produced according to an overall reaction formula $CO+H_2=H_2+CO_2$, and wherein when the feed gas is a mixture between a methane rich gas and syngas, the hydrogen is produced via a combination of SE-SMR and an overall reaction formula $CO+H_2=H_2+CO_2$.

8. The device according to claim 7, further comprising a second SOFC arranged to receive hydrogen in order to produce electricity and heat.

9. The method of claim 1, wherein the hydrogen gas forming reactor system operates by a process chosen between one or more of sorption enhanced steam methane reforming (SE-SMR) and a CO-shift reaction and yields a net output of heat and hydrogen.

10. The device of claim 7, wherein the hydrogen gas forming reactor system operates by a process chosen between one or more of sorption enhanced steam methane reforming (SE-SMR) and a CO-shift reaction.

* * * * *